Sept. 22, 1964   T. G. JUNGERSEN ETAL   3,149,807
PARACHUTE AUTOMATIC RELEASE FOR PERSONNEL
Filed June 26, 1963   5 Sheets-Sheet 1

INVENTORS

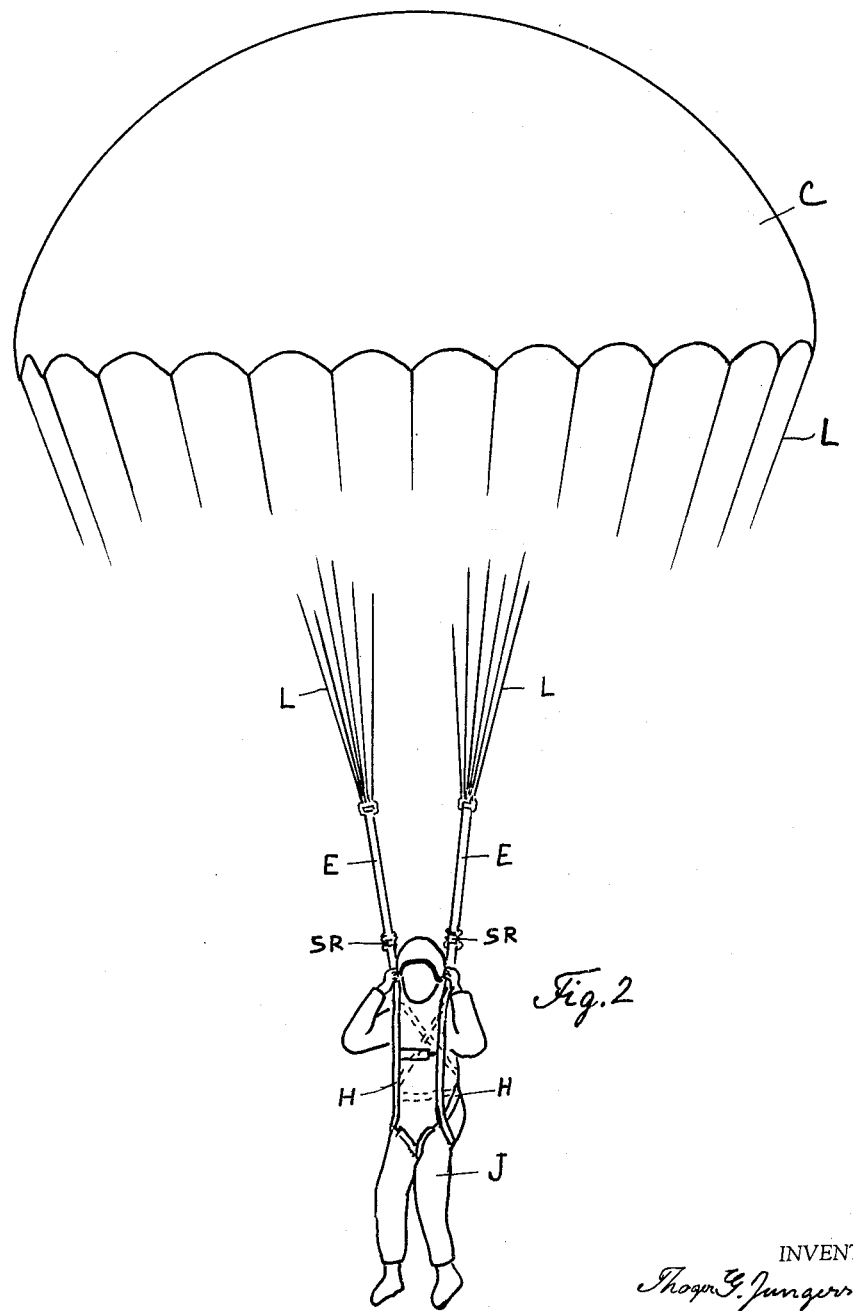

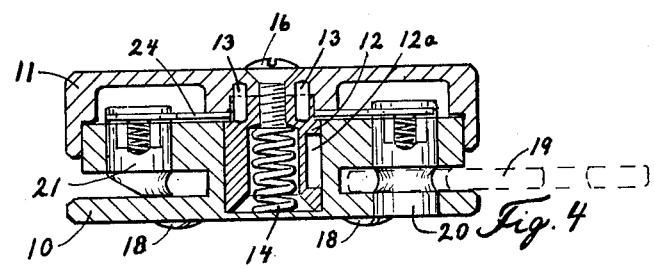
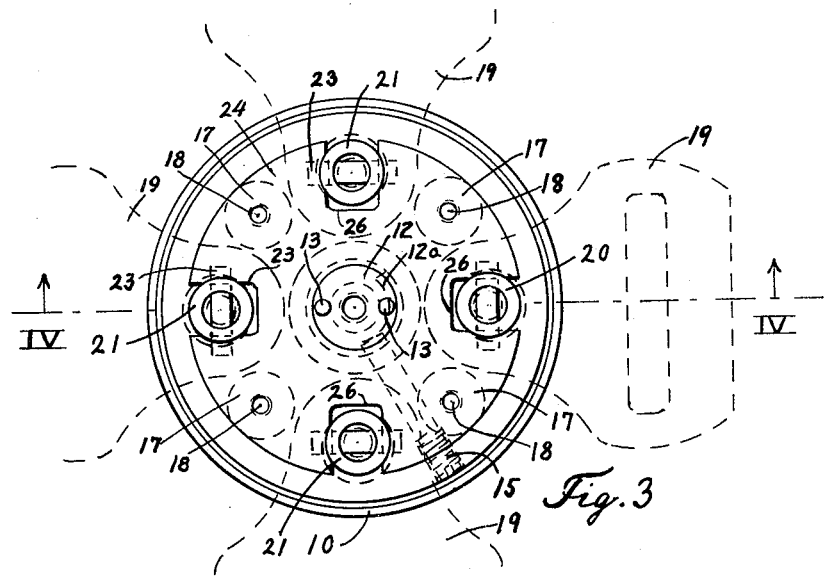
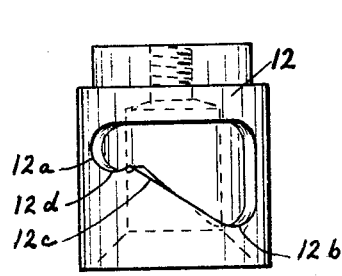
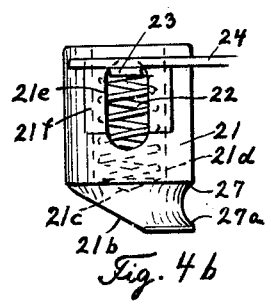
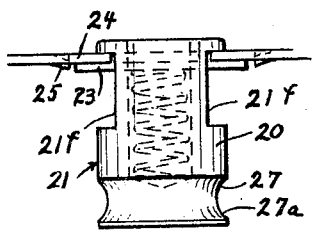

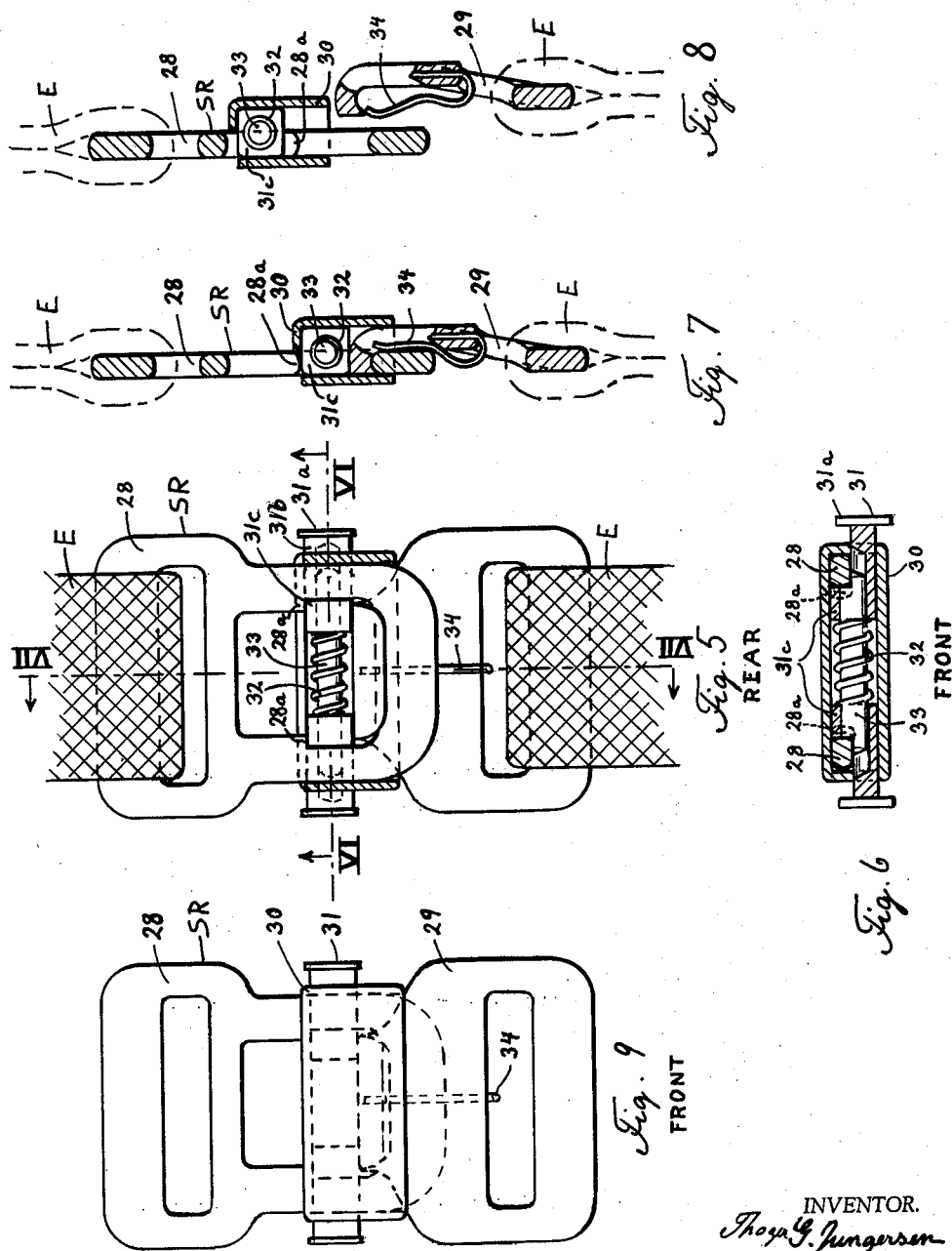

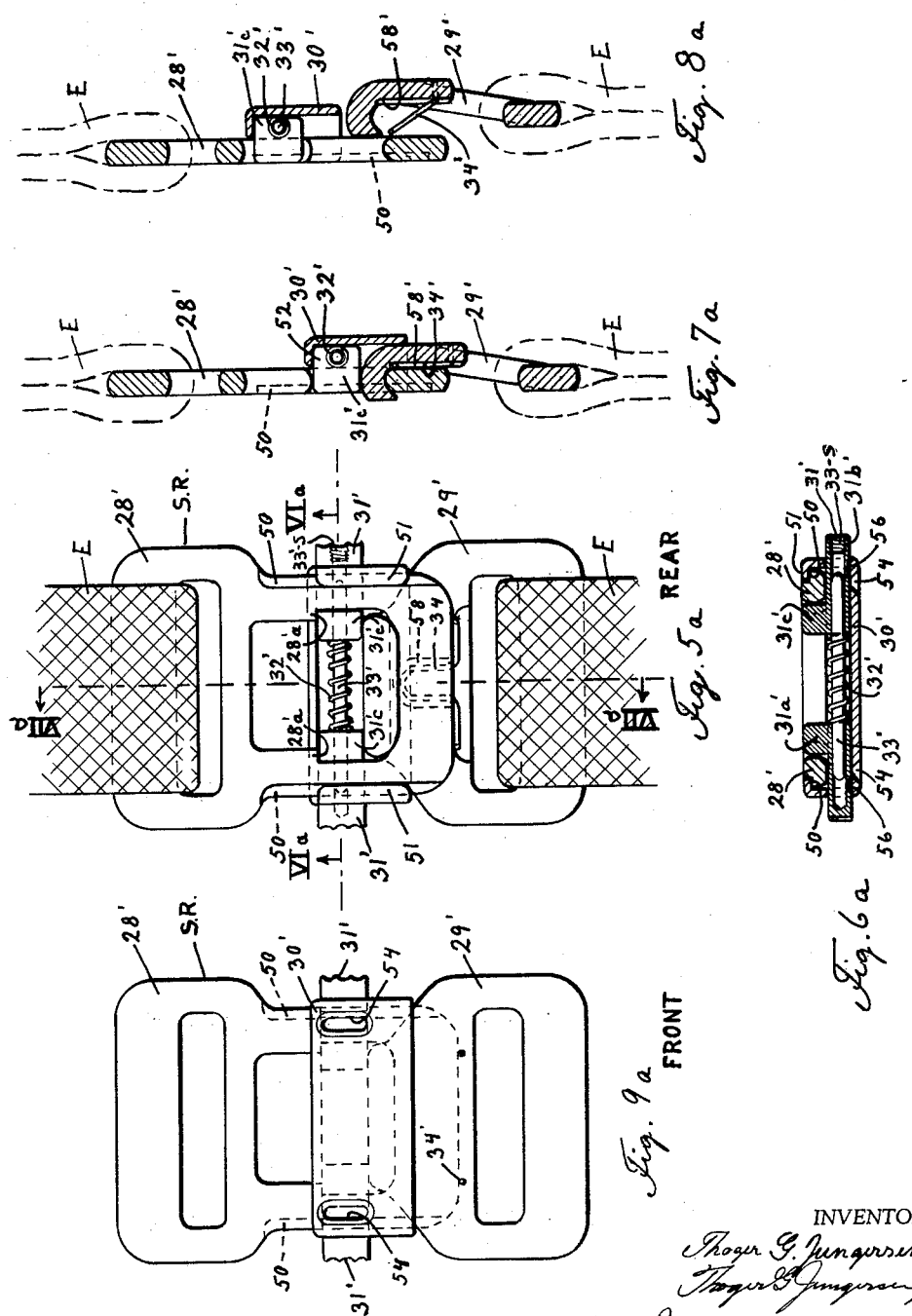

United States Patent Office 3,149,807
Patented Sept. 22, 1964

3,149,807
PARACHUTE AUTOMATIC RELEASE
FOR PERSONNEL
Thoger G. Jungersen and Thoger G. Jungersen, Jr., New Providence, N.J. (both of P.O. Box 28, Summit, N.J.)
Filed June 26, 1963, Ser. No. 290,773
9 Claims. (Cl. 244—151)

This invention relates to a safety release for parachutes and the like, and more particularly to an automatic parachute harness and riser (usually a strap connected to shroud lines) release for personnel, such as military personnel.

This application is a continuation-in-part of our co-pending application Serial No. 209,439, filed July 12, 1962, entitled "Parachute Automatic Release for Personnel," and now abandoned.

Prior to the instant invention, automatic parachute releases have been most unsatisfactory and very dangerous for use by personnel. Prior release hardware for use by personnel has been substantially exclusively of the non-automatic type characterized by the term "quick release," which requires a manual operation after landing, and this is dangerous under adverse conditions.

In the past, we have been mindful of the difficulties experienced with the non-automatic "quick release" hardware resulting in injuries to an entire group of military jumpers whose parachutes, under the influence of strong wind, caused the dragging of the men over the ground striking rocks, bushes, trees, and the dragging of the men into crevices and ravines. With our new automatic release most of these injuries would have been avoided.

Military personnel, fire patrol, and others, may be committed to jump at times when weather conditions are far from ideal; then such releases as were heretofore available would not provide the expected safety, nor could they insure that such personnel would be immediately effective for action upon landing.

It is an object of the instant invention to provide a parachute harness release mechanism which, at the jumper's discretion, is capable of automatically releasing the harness or canopy from the jumper upon his contact with the ground while, at the same time, the harness or canopy is positively locked to the jumper during the descent.

It is a further object of the instant invention to provide a release mechanism which will operate either automatically or manually but quickly at the discretion of the jumper. In those instances after the jumper has ascertained that the landing will be on level ground and under relatively safe conditions, the release device may be operated as a "quick release" mechanism. Under high wind conditions or when landing on water, for example, the jumper may cause the release device to operate automatically.

It is still another object of the instant invention to provide an automatic harness release in order that the jumper may have his hands completely free for any of various purposes, including self-protection or offensive action.

A still further object of the present invention is to provide an automatic harness release which includes visible signal means apprising one that the harness is in a properly locked condition.

Other objects and the nature and advantages of the instant invention will be apparent from the following description taken in conjunction with the accompanying drawings, wherein:

FIG. 2 is a view similar to FIG. 1 but illustrating a modified form of release hardware (as illustrated only the canopy will be released upon landing);

FIG. 3 is a plan view of the release hardware shown associated with the harness illustrated in FIG. 1 and with the cover removed and with the harness connectors shown in dotted lines;

FIG. 4 is a vertical sectional view, with parts shown in elevation, taken along line IV—IV of FIG. 3 and looking in the direction of the arrows;

FIG. 4a is a view in elevation of an element or component of the organization shown in FIG. 4;

FIG. 4b is a view in elevation of another element or component of the organization shown in FIG. 4;

FIG. 4c is a view in elevation of the same component shown in FIG. 4b but taken at right angles thereto;

FIG. 5 is a plan view of the modified form of release hardware illustrated in FIG. 2, with a portion removed and shown in action;

FIG. 5a is a plan view similar to FIG. 5, showing a slightly modified form of the release hardware of FIG. 2;

FIG. 6 is a vertical sectional view taken along line VI—VI of FIG. 5 and looking in the direction of the arrows;

FIG. 6a is a sectional view similar to FIG. 6 and taken substantially along line VIa—VIa of FIG. 5a;

FIG. 7 is a vertical sectional view taken along line VII—VII of FIG. 5 and looking in the direction of the arrows;

FIG. 7a is a sectional view similar to FIG. 7 and taken substantially along line VIIa—VIIa of FIG. 5a;

FIG. 8 is a view similar to FIG. 7 showing the shroud connector at the moment of complete release;

FIG. 8a is a view similar to FIG. 8 showing the shroud connector at the moment of complete release;

FIG. 9 is a plan view of the modified release hardware of FIG. 2, showing the appearance of the side opposite that shown in FIG. 5; and FIG. 9a is a view similar to FIG. 9 clearly showing the visible signal means on the release hardware.

Figure 1:
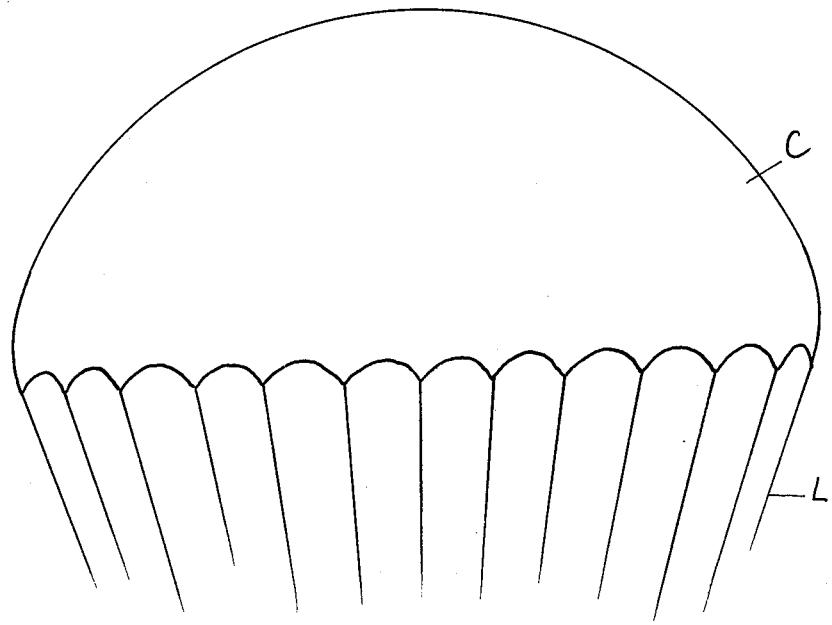
FIG. 1 is a schematic perspective view with parts broken away of a military parachutist in the midst of a descent with the parachute fully opened and with the parachutist in harness with the release hardware in place (his harness would fall completely off of the jumper upon landing)
Figure 1:
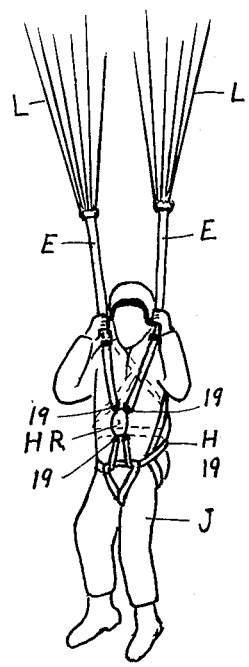

Referring to the drawings, and more particularly to FIGS. 1, 3 and 4, the jumper J is encased in the harness H which includes the harness connectors 19 associated with the harness release hardware HR. The portions E which extend upwardly from the harness and are associated with the shroud lines L serve to coordinate the parachute canopy C with the jumper J through the harness H and the harness release hardware HR.

The harness release hardware HR and its association with the harness connectors 19 is illustrated in more detail in FIGS. 3 and 4. The main body 10 of the harness release HR is provided with a cover 11 as illustrated in FIG. 4, which has been removed from the showing in FIG. 3 for purposes of clarity.

The main body 10 is provided at its center with a generally cylindrical element designated as the cam 12 which is formed with a cam face 12a, which will be described subsequently in relation to the cam follower or cam screw 15. The two dowel pins 13 may be fitted to the cam 12 by a press fit, for example, though any association which will provide positive engagement therewith will be satisfactory. These dowel pins 13 serve as connectors with the cover 11 when said cover is in place so that when said cover is rotated the rotational movement will be transmitted to the cam 12.

The release spring 14, shown in elevation in FIG. 4, has its bottom end bearing against the base of the main body 10 and its upper end against the roof of the inverted cup-shaped cavity within the cam 12. The release spring 14 is normally under compression so that it tends to force the cam 12 out of the body 10.

The cavity 12a in the side of the cam 12 has its outer margins so formed as illustrated in FIG. 4a as to cooperate with the cam screw 15 to bring about the desired operation of the harness release HR.

The margins of the cavity 12a of the cam 12 include a low point 12b, an inclined section 12c, and a locking depression 12d. The locking depression 12d is connected with the upper portion of the inclined section 12c along a line which is at an effective angle with the horizontal, as viewed in FIG. 4a, from about 25–30°. When the cam screw 15 is associated with the locking depression 12d and the harness release mechanism HR is in locked position, the spring 14 is substantially under its greatest compression. When the cam 12 is rotated by rotating the cover 11, which rotation is transmitted to the cam 12 through the pins 13 so that the cam screw 15 is released from engagement with the locking depression 12d, the spring 14, being under compression, will expand and cause the cam 12 to move away from the body 10, and, in effect, the cam screw 15 will ride down the inclined portion 12c into a position corresponding to 12b. It is to be noted that this action will take place provided that there is no tension on the harness portions or extensions associated with the harness connectors 19 and reference to these will be made below. This is the "quick release" action as when the parachutist has already landed.

The cover screw 16 serves to hold the cover 11 to the cam 12 as illustrated in FIG. 4. It is to be noted that when the cam 12 is released as described above, both the cover 11 and the cam 12 will move away from the body 10.

The harness connector spacers 17 are tubular in form and are held in place by screws 18 which engage the body 10. When four harness connectors 19 are utilized, four spacers are utilized and when more harness connectors are utilized, then correspondingly more spacers may be used.

The harness connector locking pins are illustrated in side elevation in FIG. 4 and in top plan view in FIG. 3. One of the locking connector pins 20 is called the permanent locking pin and extends through the very bottom or base of the body 10. The other three locking connector pins 21 are provided along their bottom surface with an inclined cam face 21b so that when the harness connector 19 is pushed in against this inclined surface 21b, the floor 21c of the cavity 21d within the locking connector pin 21 may push on the spring 22 and place it under greater compression. The top of the spring 22 engages the underside of the cross bar 23 which passes through the slot 21e in the locking connector pin 21. The cross bar 23 is engaged with the underside of the release plate 24 which may be slightly deformed by a punch, as at 25, so as to inhibit disarrangement of the cross bar 23.

The flat surfaces 21f cooperate with the two sides of the U-shaped cut-out 26 formed in the periphery of the release plate 24.

The inclined flat cam surface 21b of the locking connector pins 21 always faces in a direction radially away from the center of the harness release HR. About the bottom of each locking connector pin 21, on the side opposite to the inclined cam face 21b and at a corresponding elevation in the locking connection pin 20, there is a groove or channel-like formation 27 which serves to engage the harness connectors 19. The effective angle with the vertical of the lowermost portion 27a of the groove or channel 27, when viewed as in FIGS. 4, 4b and 4c, is from approximately 25° to 30°.

When the connector locking pins, viewed as in FIGS. 4, 4b and 4c, are moved upwardly as by the action of the spring 14, when the cam 12 is in the position which permits such movement, and there is little or no outward tension on the harness connectors 19, they will be released but when there is a definite tension on the harness connectors 19, the harness connectors 19 cannot be prematurely released.

With the harness release mechanism in locked position as illustrated in FIG. 4, and with the cam screw 15 engaging the locking depression 12d, the paratrooper or jumper is ready to leave an aircraft or begin descent. The weather conditions may normally be known to the jumper before the jump has been initiated. After the jump has been initiated, and the jumper has had an opportunity to size up the terrain, topography, obstacles and other conditions which may affect his landing, but before the actual landing takes place, the jumper may make the choice of having his harness released automatically or manually. Under such conditions as when landing over water, on a rocky terrain, or in a high wind, for example, the jumper may choose to have his harness released automatically. Prior to landing, the jumper will rotate the cover 11 through an angle of 90° so that the cam screw 15 will be released from the locking depression 12d and the cam screw 15 will then be in a position above the cam cavity margin 12b and in the upper portion of the cam cavity opposite to the side including the locking depression 12b.

As long as harness connectors are under tension, such as occurs before the jumper lands, locking connector pins 21 and locking pin 20 cannot move upwardly, or outwardly, because the effective angle of the surface portion 27a prevents such premature movement. However, when the tension on the harness connectors 19 is relieved, as when the jumper lands, the locking connector pin 20 and the locking connector pins 21 can move upwardly or outwardly, thereby completely releasing the harness.

Referring to the riser release hardware SR illustrated in FIGS. 2, 5, 6, 7 and 8, the jumper J is encased in the harness H from which portions E extend upwardly to the release hardware SR which is associated with the canopy C through shroud lines L.

Associated with the shroud release hardware SR is the eye-type harness connector 28 and the hook-type harness connector 29.

As particularly illustrated in FIGS. 5 and 7, the telescopically slidable safety housing 30 is in the safety or locked position. In FIG. 8, the safety housing 30 is shown in the position to which it has been moved so that the hardware is ready for automatic release and in this figure the hardware is illustrated at the instant of release.

As illustrated in FIGS. 5 and 6, there are two safety locks 31, each comprising a head 31a, a bored body 31b, and a hook-like terminal portion 31c. The hook projections 28a on the eye-type harness connectors 28 cooperatively engage the hook-like terminal portions 31c, as illustrated in FIGS. 5 and 7, wherein the release hardware is in locked position with the safety housing 30 in its lowermost position, as viewed in FIG. 5. In this position, the lock spring 32, which is coiled about the spring guide pin 33, is in compression and bears against the inner ends of the safety locks 31.

After the parachutist has landed, with the release hardware in the position shown in FIG. 5, the safety housing 30 may be raised from its position shown in FIG. 5 to the position shown in FIG. 8 to effect a "quick release."

When an automatic release is desired, and the parachutist is descending and approaching the ground, the safety locks 31 must be simultaneously pressed inwardly and the safety housing 30 must be raised from the position shown in FIG. 5 to the position shown in FIG. 8 and then upon landing the spring 34 will activate the automatic release to change the position of the hook-type harness connector 29 from that shown in FIG. 7 to the position illustrated in FIG. 8. The hook on the harness connector 29, as viewed in FIGS. 7 and 8, has its terminal portion so formed as to have an effective angle with the horizontal of approximately from 25–30° as recited in connection with the description of the portion 27a of the groove or channel 27 formed in the locking connector pins 20 and 21 and for similar purpose (see FIGS. 4, 4b and 4c).

With the eye-type harness connector 28 and the hook-type connector 29 and the safety housing 30 in the position shown in FIG. 5, there can be no release. After the two safety locks 31 are pressed inwardly simultaneously and the safety housing 30 raised in the position shown in FIG. 8, when the extensions E are under tension, as when the parachutist is still descending, there can be no premature release. It is only after the parachutist has landed or the tension on the harness connectors released that the spring 34 can effect the automatic release. It is to be noted that to set up the shroud release for automatic operation, one of the steps includes pressing both of the safety locks 31 simultaneously by pressing them both inwardly and then pushing them upwardly, when viewed as in FIG. 5.

To place the elements of the riser release hardware in the engaged position, starting with the elements in the position illustrated in FIG. 8, the hook-type harness connector 29 must be placed in its position through the eye of the tye-type harness connector 28 and thereafter slide the safety housing 30 from the position illustrated in FIG. 8 to the position illustrated in FIGS. 5 and 7, which will automatically compress spring 34 allowing the safety locks 31 to snap into locked position under projection or shoulder 28a. Even with the safety housing 30 raised as illustrated in FIG. 8, the harness connector elements 28 and 29 cannot be separated as long as there is tension on the risers or strap-like extensions E. However, when this tension is released, as when the parachutist has landed, the operation of the automatic hardware comes into play and the automatic release is effected so that, for example, a military parachutist may land safely under conditions of high wind and the like and be more completely ready to defend himself or take offensive action.

Though the riser release hardware SR has been illustrated in FIG. 2 as being located at or above the level of the head of the parachutist, this hardware may be located elsewhere in other strategic locations in the harness of the parachutist and its action will be as described above.

In connection with the harness release hardware HR and the riser release hardware SR, there have been described mating surfaces having an effective angle with the horizontal of approximately from 25°–30° and it is to be understood in connection with this explanation that this angle in terms of degrees is set forth herein only by way of example and the inclination may be modified to suit the circumstances, having regard for utilizing sufficient up-hill angle to prevent premature disengagement while the connectors are under tension so as to require a positive force for such disengagement.

Referring to FIGS. 5a, 6a, 7a, 8a, and 9a, a slightly modified embodiment of the release hardware is indicated generally at SR' and primed reference numerals similar to those used in FIGS. 5–9, respectively, will be used to identify similarly functioning structure.

The shroud release hardware SR' includes an eye-type harness connector 28' and hook-type harness connector 29'. As seen in FIGS. 5a–9a, displaceable, slidable safety housing 30' is mounted on the connector 28'.

The connector 28' includes opposed side flanges 50, which receive reverse bent ends 51 of the housing 30' thereon. The housing 30' includes an upper flange 52, which overlies a pair of safety locks 31', which include a hook-like terminal abutment portion 31c'. The terminal abutment portions 31c' will engage projections or shoulders 28a' of the connectors 28' as explained in relation to FIGS. 5a–9a (see FIG. 5a, for example).

A pin 33' extends through the safety locks 31' and the terminal ends of the lock 31' project laterally through opposed aperture portions of the housing 30'. A set screw 33'-S prevents the pin 33' from falling out. A compression spring 32' is circumposed about the pin 33 and normally urges the safety locks 31' outwardly to the position shown in FIGS. 5a–7a and 9a.

The housing 30' includes, inwardly of opposite side edges, openings 54, and when the safety locks 31' are in an open or unlocked condition, i·e., pressed inwardly from the position shown in FIG. 9a, a strip of paint 56 (preferably red) can be seen at the opening 54 (see FIG. 6a, for example).

The colored indicia 56 will be visible to the "jump master" who makes the final check before a jump, or the parachutist will observe that the indicia 56 is visible. This is a safety means in the event the parachutist inadvertently attempts to jump with the release hardware without all three safety locks secured.

The hook-type connector 29' includes a slightly modified spring 34' which normally urges the connector 28' from the position shown in FIG. 7a to the decoupled position shown in FIG. 8a. The spring 34' will be urged under compression into a suitable recess 58 formed in the connector 29', and when the housing 30' is raised to the position shown in FIG. 8a and tension no longer exists between the parts 28', 29', i.e., when the parachutist lands, the spring 34' will cause automatic decoupling between connectors 28', 29'.

In all other respects the embodiments of FIGS. 5–9 and 5a–9a are similar, and the apertures 54 and indicia 56 of FIGS. 5a–9a can be readily incorporated in the embodiment of FIGS. 5–9. Further, although the housing 30' and spring 34' are slightly modified and simplified, as compared with the similar functioning structure of FIGS. 5–9, these parts are the full functional equivalent of parts 30, 34, etc.

It will be obvious to those skilled in the art that various changes may be made without departing from the scope of the invention and therefore the invention is not limited to what is shown in the drawings and described in the specification but only as indicated in the appended claims.

What is claimed is:

1. A jumper-operated, optionally automatic, personnel release mechanism for a parachute harness, said mechanism comprising front and rear portions and including releasable connector means for connection in a parachute harness and subject to descending tension imposed thereon, said release mechanism including tension lock means retaining said connector means on said mechanism during descent of the jumper, said release mechanism including manually operable safety-lock means for controlling detachment of said connector means from said release mechanism in all attitudes of descent of personnel, said safety-lock means including an operating member located in an unobstructed and immediately accessible position outside the inward-rearward projection from said connector means for instant operation by personnel, said safety lock means including a manually displaceable portion positionable with respect to said connector means in a positive lock position, an automatic release position, and a relock position at the jumper's option during descent, and motor means on said release mechanism and subject to control by said safety lock means displaceable portion, said motor means normally reacting to disconnect said connector means when the safety lock means is unlocked and descending tension is not imposed on the parachute harness.

2. The structure as set forth in claim 1 in which said personnel release mechanism comprises a main body, characterized in that said tension lock means comprises at least one retractable locking pin means mounted on said main body, said locking pin means including an inclined surface extending away from the outer margin of said main body and normally engaging said connector means.

3. The structure of claim 2 characterized in that said connector means comprises at least a pair of apertured plate-like elements disposed in substantially planar relation, one of said connector elements being permanently connected to said body member, the other of said connector elements being removably received on said locking pin means.

4. The structure of claim 3 characterized in that said safety lock means comprises a cover member journaled on said body member, said cover member including a cam connected to and rotatable with said cover member, a mounting plate supported on said cam between said cover and said body and displaceable therebetween in response to rotation of said cover member, said locking pin means depending from said mounting plate in the direction of movement thereof.

5. The structure of claim 4 characterized in that said locking pin means includes a spring mounting independently urging said lock pin means toward an extended position with respect to said cover member.

6. The structure of claim 3 characterized in that said motor means comprises a compression spring normally applying axial pressure to said cover member along the axis of rotation thereof.

7. The structure of claim 1 characterized in that said connector means comprises a pair of substantially planar connector eye elements disposed in overlapped relation, said tension lock means comprises an angular, transverse hook portion on one of said connector eye elements and disposed intermediately of said other connector eye element, said motor means comprises a spring normally urged laterally from the plane of one of said connector eye elements substantially normal to said hook portion, said safety lock means including a housing element reciprocably supported on one of said safety eye elements and positionable in overlying relation to said overlapped portions of said connector eye elements and said spring.

8. The structure of claim 7 characterized in that said housing element includes a pair of opposed, displaceable lock elements extending from opposite sides of said housing, a spring extending between said lock elements and normally urging them apart, abutment portions on said connector eye element upon which said housing is mounted for engagement by said lock elements and retaining same in a position for preventing separation of said eye elements by said motor means, said connector eye element upon which said housing is mounted including a portion for receiving said lock elements therein when said lock elements are urged toward each other and said housing is moved from overlapping relation with respect to the overlapped portions of said connector eye elements.

9. The structure of claim 8 characterized in that said housing includes an apertured portion in alignment with at least one of said lock elements, said last mentioned one lock element including visual signal indicia alignable with said apertured portion when said last mentioned locking element is displaced inwardly.

References Cited in the file of this patent

UNITED STATES PATENTS

| | | |
|---|---|---|
| 2,328,914 | Kubat | Sept. 7, 1943 |
| 2,439,613 | Quilter | Apr. 13, 1948 |
| 2,488,537 | Hattan | Nov. 22, 1949 |

FOREIGN PATENTS

| | | |
|---|---|---|
| 99,113 | Switzerland | June 1, 1923 |